United States Patent [19]

Lindsay

[11] Patent Number: 5,028,072
[45] Date of Patent: Jul. 2, 1991

[54] TOWABLE UNIFIED FLOOR FRAME ASSEMBLY

[75] Inventor: Frederick H. Lindsay, Seminole, Fla.

[73] Assignee: Lindsay Industries, Inc., Seminole, Fla.

[21] Appl. No.: 489,303

[22] Filed: Mar. 5, 1990

Related U.S. Application Data

[63] Continuation-in-part of Ser. No. 142,555, Jan. 11, 1988, Pat. No. 4,930,809.

[51] Int. Cl.⁵ .......................... B60P 3/32; B62D 21/00
[52] U.S. Cl. .................................. 280/789; 296/204; 52/143
[58] Field of Search ................ 52/690, 692, 693, 695; 280/789, 799, 798, 781; 296/181, 168, 182, 204

[56] References Cited

U.S. PATENT DOCUMENTS

| | | | |
|---|---|---|---|
| 2,851,281 | 9/1958 | Felburn | 280/423.1 |
| 3,282,603 | 11/1966 | Barth | 280/789 |
| 3,716,267 | 2/1973 | Lindsay | 296/168 |
| 3,738,678 | 6/1973 | King et al. | 52/656 |
| 3,806,147 | 4/1974 | Hanson | 280/30 |
| 4,015,375 | 4/1977 | Lindsay | 52/143 |
| 4,019,299 | 4/1977 | Lindsay | 52/648 |
| 4,106,258 | 4/1978 | Lindsay | 52/693 |
| 4,232,884 | 11/1980 | DeWitt | 280/785 |

Primary Examiner—Richard A. Bertsch
Attorney, Agent, or Firm—Lowe, Price, LeBlanc & Becker

[57] ABSTRACT

A unified floor frame assembly has two elongate outer load-supporting beams formed of wooden elongate beam sections that may be selected to have different vertical cross-sectional dimensions and, optionally with two thicknesses united, are butt-spliced to be cambered in parallel vertical planes to counter forces that may tend to cause sagging of the floor frame assembly during transportation. A wheel carrier assembly is detachably mountable thereto with a plurality of wheels partially recessed within the floor frame assembly and a towing hitch assembly is attachable to a forward end of the floor frame assembly for applying a towing force thereat. Wooden I-beams are used as transverse frame members to provide lightweight strength and floor frame widths of the order of 18 ft. to 20 ft. A moisture, dirt, insect and pest excluding thin covering is provided underneath the floor frame assembly, and sections of heating and ventilating ducting, piping, wiring and the like are includable during manufacture of the floor frame assembly. Individual floor frame assemblies may be supported at their permanent location underneath the periphery or, where two such floor frame assemblies are to be coupled to obtain a larger size floor, central elongate beams may be supported by metal posts. Upon delivery of the floor frame assembly to its intended location, the wheel carrier assembly and the towing hitch assembly are both detached and removed therefrom for reuse.

10 Claims, 10 Drawing Sheets

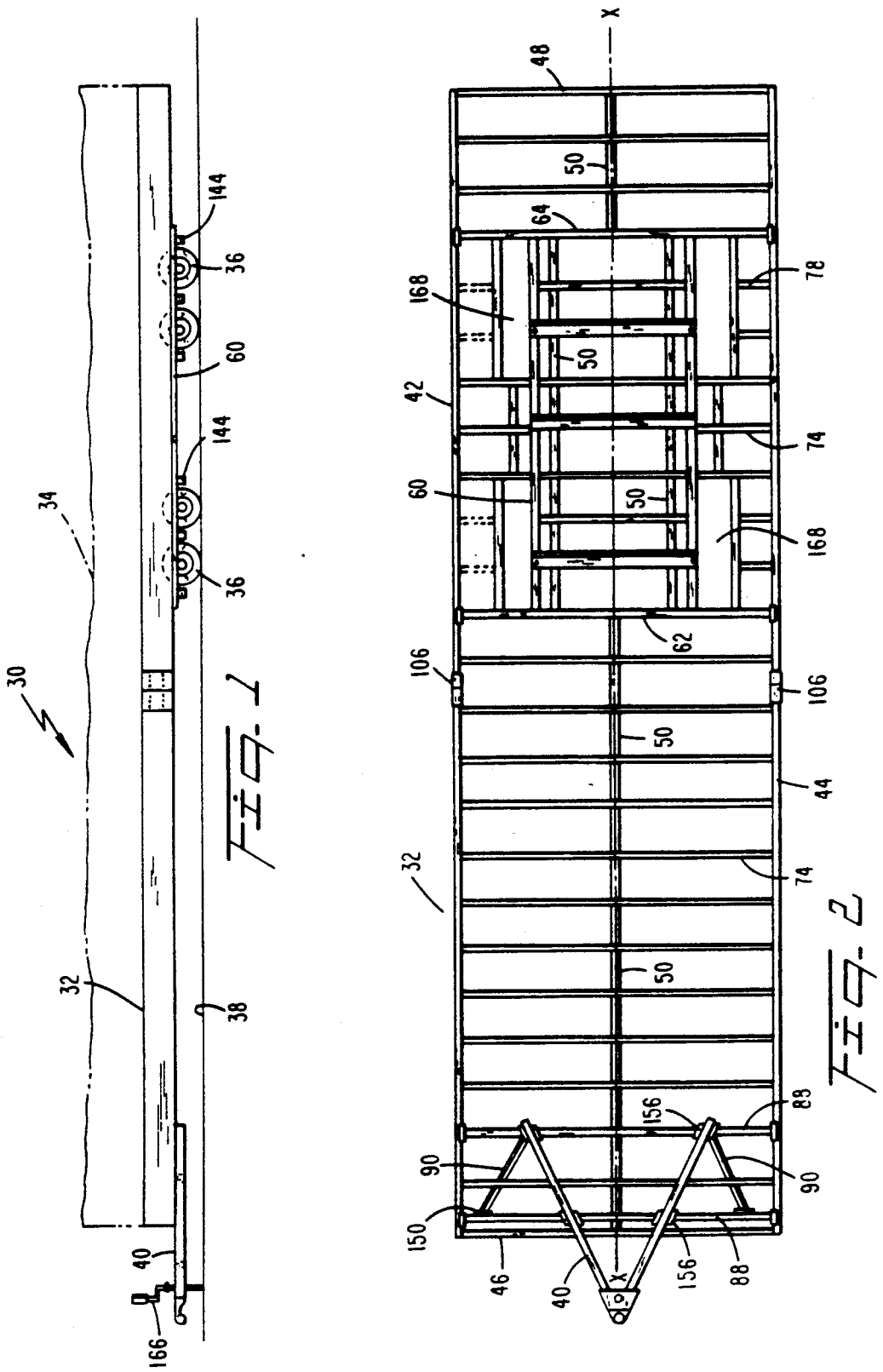

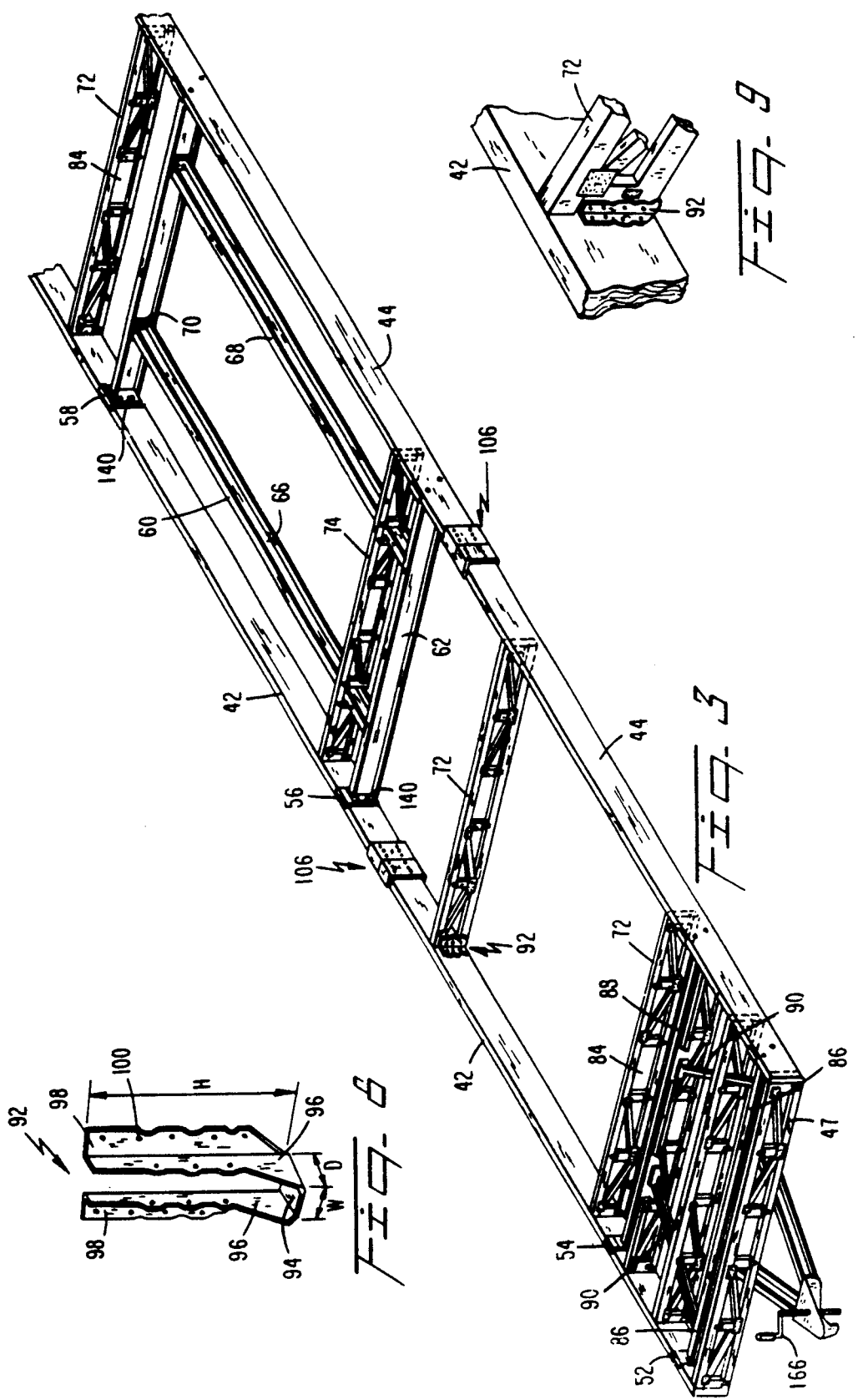

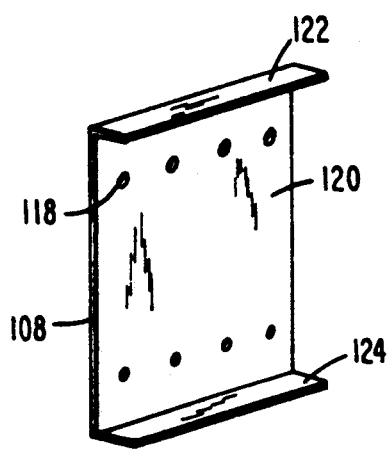
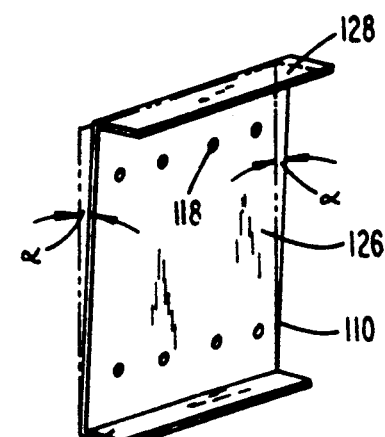
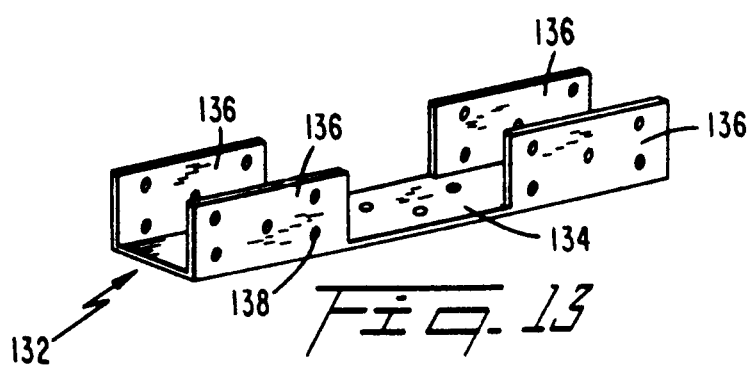
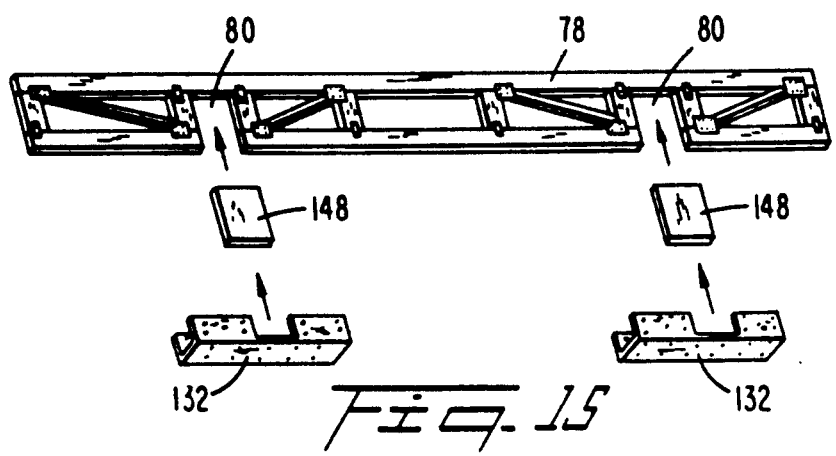

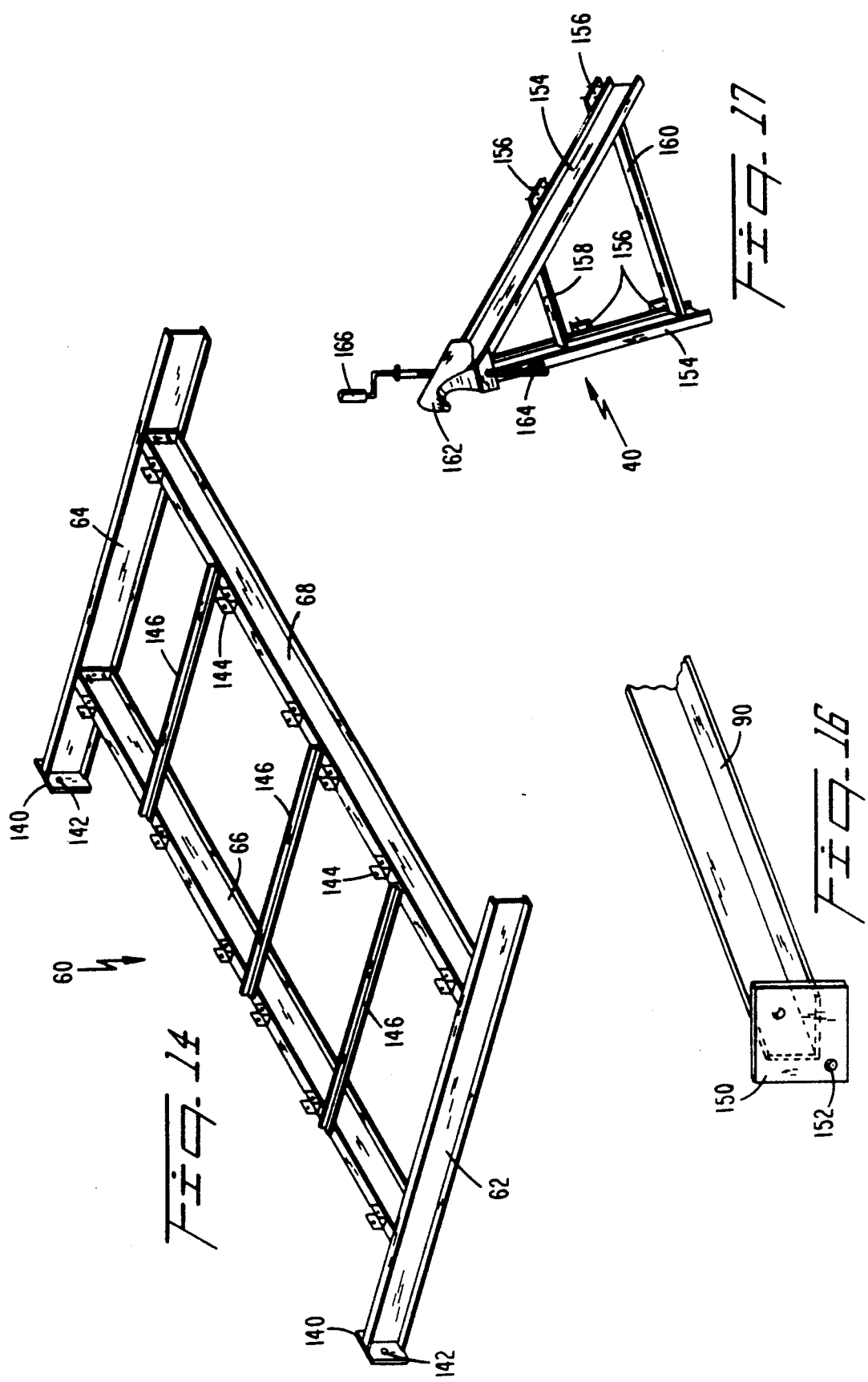

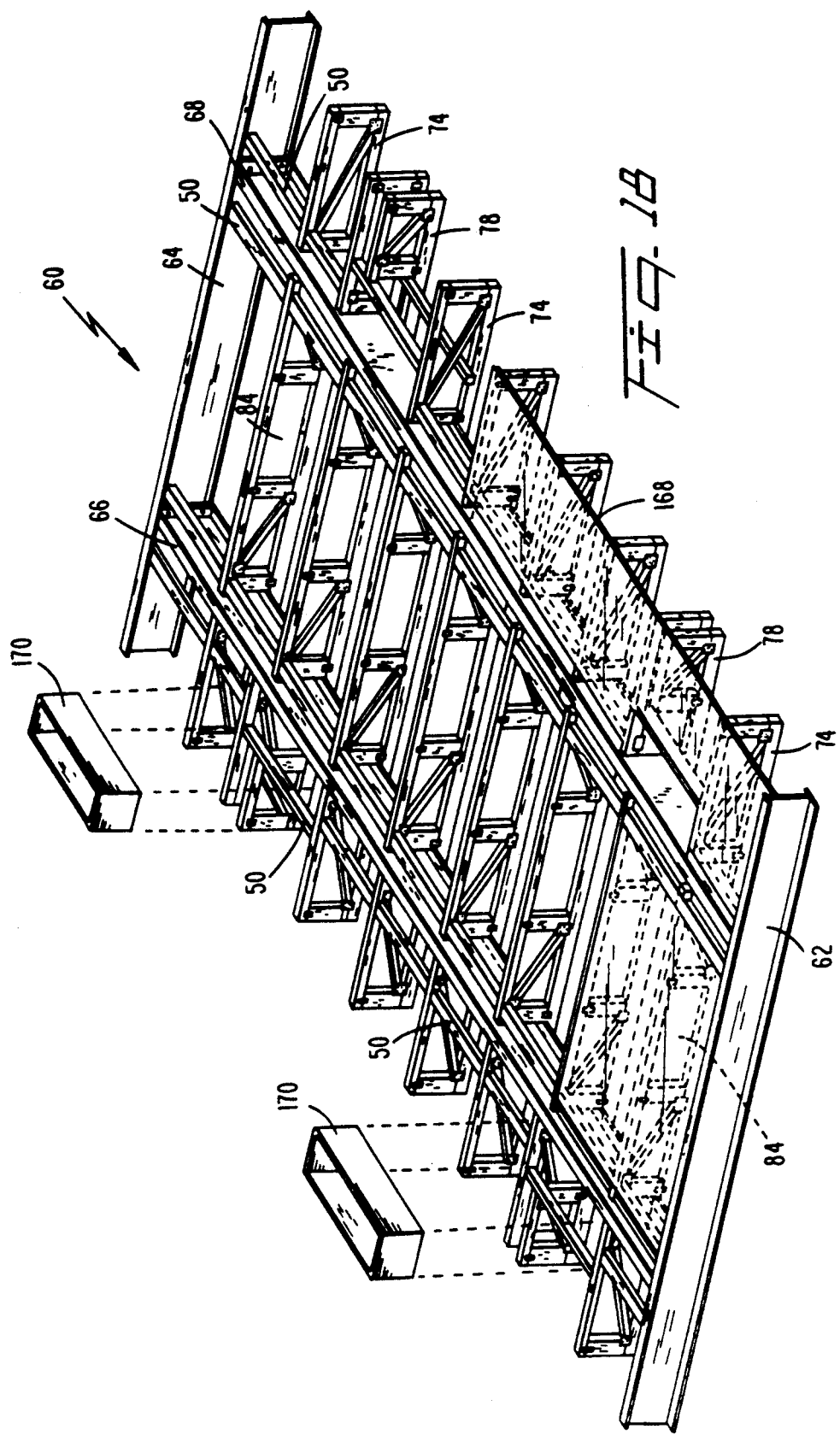

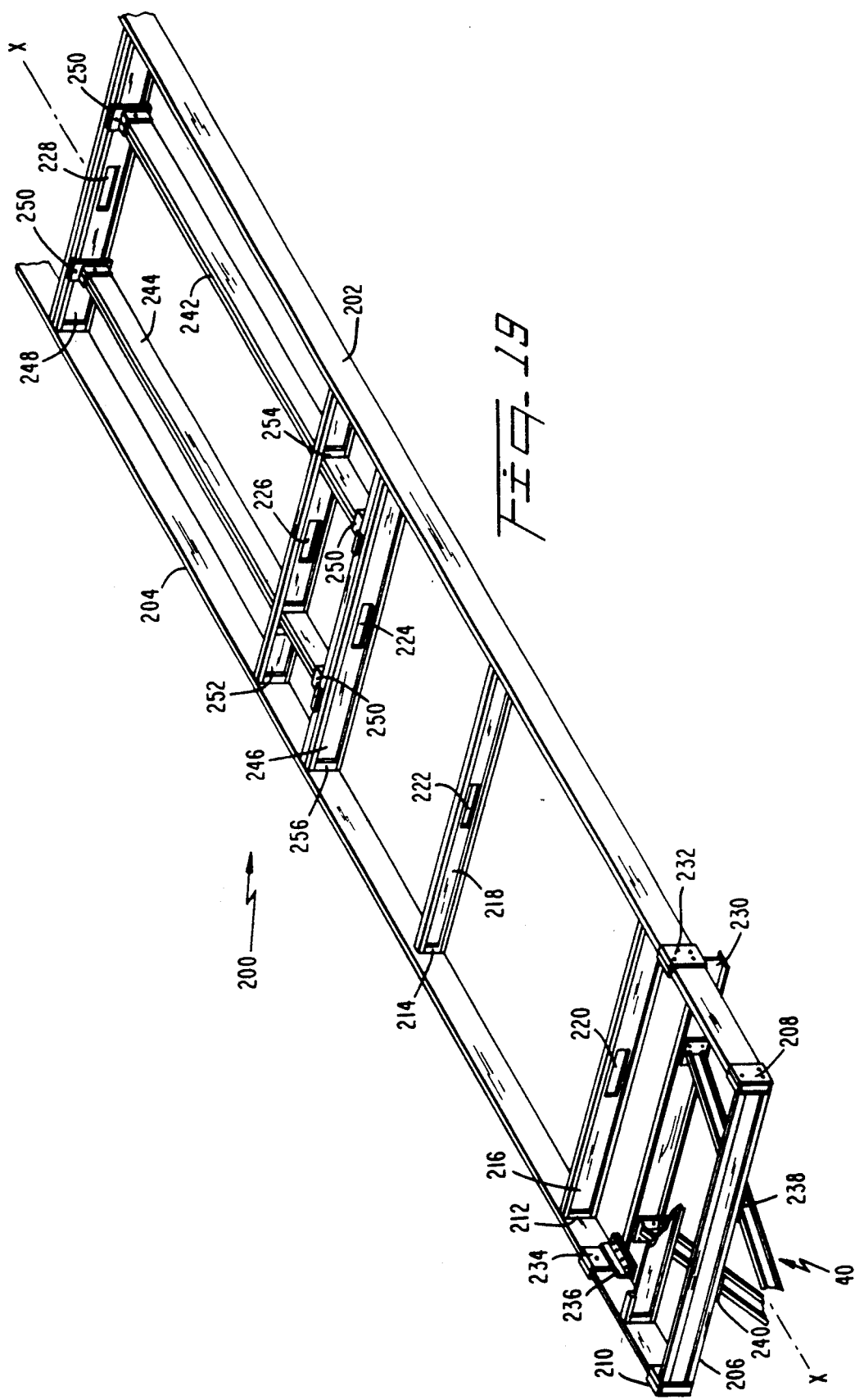

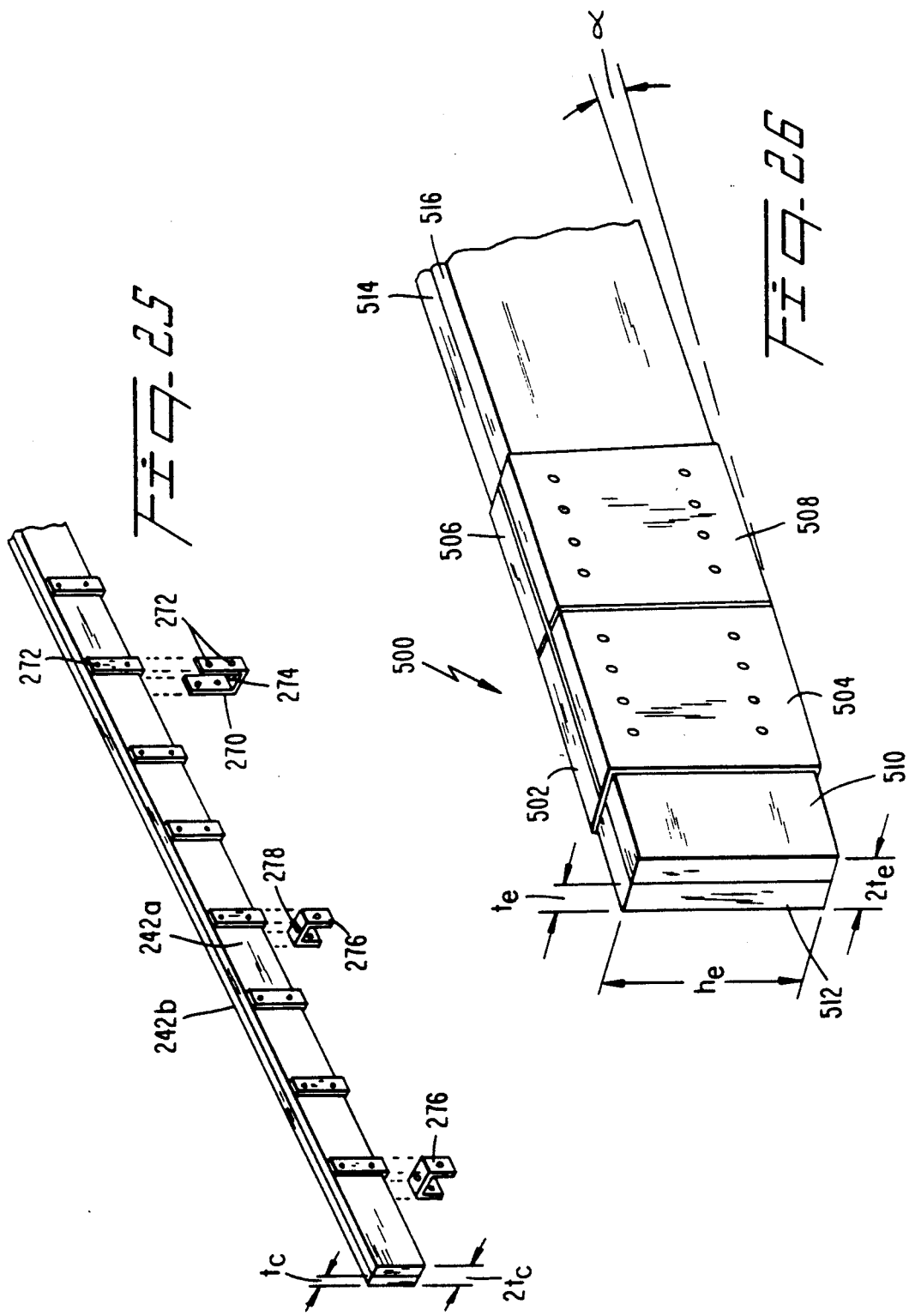

TOWABLE UNIFIED FLOOR FRAME ASSEMBLY

This is a continuation-in-part of my pending U.S. patent application Ser. No. 07/142,555, filed on Jan. 11, 1988, and now U.S. Pat. No. 4,930,909.

FIELD OF THE INVENTION

This invention relates generally to wide floor frame assemblies for prefabricated modular housing construction and, more particularly, to a wide unified floor frame assembly incorporating wooden I-beams instead of conventional trusses for transverse floor support, with optional step-down floor portions, that is readily towable to its permanent location in a stable manner by means of detachable wheels and a towing hitch assembly which are then readily detached from the floor assembly for reuse.

BACKGROUND OF THE INVENTION

As the population grows and as traditional building methods become increasingly expensive, it has become more desirable for prospective homeowners to use prefabricated modular elements such as floor frame assemblies in building new homes. Such floor frame assemblies, with or without walls, roof, windows and doors and similar superstructure, are normally manufactured at one location and, then, towed along public highways to their ultimate destinations to be mounted on permanent supports in a safe and stable manner.

Every jurisdiction has local housing codes and standards that apply to such structures. Manufacturers, therefore, design the same to satisfy at least the Uniform Building Code (UBC). In addition to satisfying such requirements, the prefabricated structure must be transported in a safe and stable manner at highway speeds, a fact which requires that the structure being transported be capable of tolerating exposure to incidental bouncing and shock loading.

In order to reduce the overall costs to the ultimate purchaser, it is highly desirable to design the structure so that it is transported to its permanent destination in a manner that allows detachment therefrom and retrieval for reuse of any wheels and the towing hitch assembly that were utilized during transportation. Although considerable work has been done in the field of this invention in meeting the needs outlined hereinabove as exemplified in my own patents, U.S. Pat. Nos. 3,716,267, 4,015,375, 4,106,258, 4,019,299 and 4,863,189, all of which are incorporated herein by reference, there still exists a need for an improved towable unified floor frame assembly that satisfies the UBC, is easily and safely transportable to its ultimate destination and from which the towing wheels and towing hitch elements can then be readily detached and retrieved for reuse.

In particular, there is an unfulfilled need for large unified modular floor frame assemblies in lengths of 60 ft. or more and widths of 18 ft. to 20 ft. Such assemblies are not easy to construct by conventional techniques to the strengths needed to support the floor loading often encountered in homes or offices with heavy furniture, file cabinets, or office equipment. Furthermore, especially where such flooring is utilized to construct homes, homeowners and home designers often desire the floor-planning flexibility of step-down floor portions to define different regions in a given room, e.g., a sunken living area approachable from a hallway or entrance, a sunken area for a bedroom to be provided with an overhead fan, and the like. To satisfy such needs, particularly for modular construction with its inherent advantages of tight quality control, economies of scale, and consistency of strength and structural dimensions, the use of wooden I-beams provides unique and nonobvious advantages over known alternatives.

Another advantage of using I-beams as joists, i.e., as transverse floor supporting members in place of conventional trusses is that a floor of exceptional width can be provided to the requisite strength yet with a small vertical dimension. This allows construction of a complete housing structure thereon in a form readily transportable on highways and under overpasses that are encountered in transporting modular homes.

The present invention satisfies all these needs at a relatively low cost because it significantly reduces the amount of metal, typically steel, that is left in the unified floor frame assembly after it is delivered to its destination. Wood is a renewable resource, unlike metal, and the reduction in use of metal made possible by this invention thus has the additional incidental benefits of lowering costs, conserving non-renewable resources, and reducing atmospheric pollution as is incidental to steel manufacture.

DISCLOSURE OF THE INVENTION

Accordingly, it is a principal object of this invention to provide a unified floor frame assembly that can be prefabricated, with or without superstructure, and can be thereafter towed in a safe and stable manner to its permanent destination.

It is another object of this invention to provide a unified floor frame assembly that can be prefabricated, with or without superstructure, that fully satisfies the Uniform Building Code (UBC) and can be towed in a safe and stable manner.

It is yet another object of this invention to provide a unified floor frame assembly that can be transported in a safe and stable manner on a wheel carriage assembly that recesses substantially into the floor frame assembly, by means of a towing hitch assembly, wherein both the wheel carriage assembly and the towing hitch assembly are readily detachable following delivery of the floor frame assembly.

It is yet another object of this invention to provide a unified floor frame assembly that is at least ninety-nine percent by weight constituted of wood or wood products, exclusive of detachable wheel carriage and towing hitch assemblies utilized during transportation of the floor assembly.

It is an even further object of this invention to provide a readily towable unified floor frame assembly that is prefabricated with a sheet-like protective layer disposed substantially over the lower expanse thereof to exclude from the floor frame assembly moisture, dirt, insects and pests.

It is yet another object of this invention to provide a readily and safely towable unified floor frame assembly that can be prefabricated with or without a superstructure, has a moisture, dirt, insect and pest excluding sheet-like layer extending across its lower expanse and has elements of heating and ventilating ducting, and/or wiring installed within during assembly and manufacture.

Yet another object of this invention is to provide a unified floor frame assembly having a length in excess of sixty feet, and widths of the order of 18 ft. to 20 ft., suitable for combining with another similar floor frame assembly, that can be transported after prefabrication with or without a superstructure, in which elongate, lengthwise-disposed, load-supporting beams are formed with a camber in the vertical plane to counter and compensate for incidental loads experienced by the assembly during its transportation from the point of manufacture to its permanent destination.

It is an additional object of this invention to provide a unified floor frame assembly, as hitherto described, with a structure incorporating wooden I-beams serving, inter alia, as transverse floor support members.

It is a related additional object of this invention to provide a unified floor frame assembly utilizing wooden I-beams as transverse floor-supporting load-bearing members in a manner that provides floor portions at different vertical locations, to thereby form step-down portions of the floor in the assembly.

These and other objects of the present invention are realized by providing a modular, readily towable unified floor frame assembly that includes two elongate outer load-supporting beams disposed parallel to a longitudinal axis of the assembly, transverse front and rear end members respectively connected perpendicular to the axis at respective front and rear ends of the outer load-supporting beams to define a perimeter of the assembly, and carrier means comprising a carrier frame and axles for supporting a plurality of load-bearing wheels shaped and sized to fit within the assembly perimeter. A plurality of first transverse members are disposed and connected normal to the elongate beams in a manner that defines a region that is free of such first transverse members and within which the detachable wheel carrier means can be received and securely attached to the floor frame assembly. Within the wheel carrier receiving region, second transverse members are disposed normal to the axis, these second transverse members each being formed with a plurality of vertical first gaps disposed symmetrically about the axis and of a width sufficient to accommodate portions of the wheel carrier frame therewithin. Within the same carrier receiving region, a plurality of third trusses is interspersed with the second transverse members and connected parallel thereto to the outer load-supporting beams, the third transverse members each being provided with a plurality of vertical second gaps that are disposed symmetrically about the assembly axis and are each of a width sufficient to accommodate load-bearing wheels of the detachable carrier means so that such wheels are partially contained within the second gaps and the floor frame assembly when the carrier means is attached to and supports the floor assembly on the wheels. Substantially flat floor sections, each at its own predetermined height commensurate with the vertical dimensions of corresponding support members thereunder are mounted atop and to the load-bearing elongate beams, the front and rear end members, and the first, second and third transverse members. A towing hitch means securely attachable to but readily detachable from the floor assembly is provided for applying a towing force at a front end thereof during transportation.

Still other objects and advantages of the present invention will become readily apparent to those skilled in this art from the following detailed description, wherein only the preferred embodiments of the invention are shown and described, simply by way of illustration of the best modes contemplated for carrying out the invention. As will be realized, the invention is capable of other and different embodiments, and its several details are capable of modifications in various obvious respects, all without departing from the claimed invention. Accordingly, the drawing and description hereof are to be regarded only as illustrative in nature and not as restrictive.

BRIEF DESCRIPTION OF THE DRAWINGS

FIG. 1 is a schematic side elevation view of the unified floor frame assembly according to a first embodiment that has a planarly contiguous floor, supported on a plurality of wheels and a forwardly attached towing hitch means.

FIG. 2 is a plan view of the underside of the unified floor frame assembly of FIG. 1 with the interior structure exposed.

FIG. 3 is a partial perspective view of the unified floor frame assembly of FIG. 1 at an intermediate stage in its assembly during manufacture.

FIG. 8 is a perspective view of an exemplary joist support bracket for mounting a truss to a load-bearing elongate beam in the embodiment of FIG. 1.

FIG. 9 is a partial perspective view illustrating a connection between a truss and a load-bearing elongate beam in the embodiment of FIG. 1.

FIGS. 11 and 12 illustrate exemplary elements of a metal beam splice utilized for connecting two pieces of elongate load-supporting beams with a predetermined camber built therein.

FIG. 13 is a perspective view of a truss splicing coupler utilized with the second and third trusses after removal of the wheel carrier from the floor frame assembly per FIG. 1.

FIG. 14 is a partial perspective view of the lower side of the frame portion of a wheel carrier assembly.

FIG. 15 is an exploded perspective view illustrating the manner in which spacer blocks are fitted into corresponding vertical gaps in the second and third trusses according to FIGS. 5 and 6.

FIG. 16 is a partial perspective view of an end portion of a bracing element related to the towing hitch attachment at a forward end of the floor frame assembly.

FIG. 17 is a perspective view looking upward at the towing hitch element attachable to the underneath forward portion of the floor frame assembly for towing thereof.

FIG. 18 is a perspective partial assembly view illustrating the juxtaposition of various lateral trusses, underneath floor covering and wheel-well casings in conjunction with the wheel carrier frame according to a the embodiment of the invention per FIG. 1.

FIG. 19 is a partial perspective view of a unified floor assembly, at an intermediate stage in its assembly during manufacture, of a second and preferred embodiment capable of being manufactured to have an even wider transverse span than the embodiment per FIG. 1 through the use of wooden I-beams.

FIG. 25 illustrates in partial perspective view how an elongate beam internal to the assembly may be structured with the use of metal limited only to brackets disposed to receive for temporary attachment thereat of axles and wheels to facilitate transportation of the manufactured assembly.

FIG. 26 illustrates in partial perspective view how load-bearing, outer, double-thickness, elongate, veneer wood beams may be butt-spliced with a predetermined longitudinal camber, particularly for very large floor assemblies according to this invention.

DESCRIPTION OF THE PREFERRED EMBODIMENTS

Figure 4:
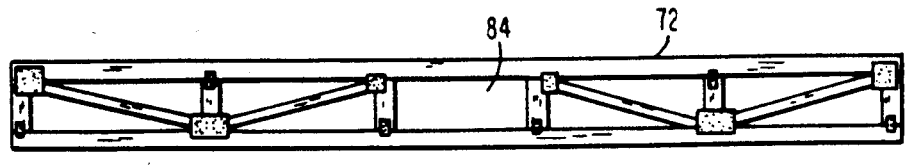
FIG. 4 is an elevation view of a first truss in the embodiment of the floor frame assembly per FIG. 1.

As best understood with reference to FIGS. 1 and 2, a typical prefabricated modular construction 30 according to a first embodiment of this invention has a readily towable unified floor frame assembly 32 on which is typically mounted a superstructure 34 comprising walls, a roof and assorted doors and windows (not illustrated). The entire structure is typically supported, during transportation from the point of assembly and manufacture to its ultimate destination, on a plurality of load contacting wheels 36 that ride over a typical road surface 38 when pulled by the application of a forwardly directed towing force on a towing hitch element 40 attached to a forward end of the structure.

Referring now to FIG. 2, the size and shape of the floor frame assembly is defined by elongate outer load-supporting beams 42 and 44, preferably made of veneered wood and each preferably disposed symmetrically to be parallel about a reference longitudinal axis X—X, and connected at their respective front and rear ends by transverse end members 46 and 48 normal thereto. A towing hitch assembly 40 is firmly but detachably attached to a lower front end portion of the floor frame assembly, preferably by bolting to I-section steel beam elements 86 and 88 which are themselves connected to elongate beams 42 and 44 and are mutually braced by bracing elements 90 (as described in greater detail hereinafter).

As more fully discussed hereinafter with reference to FIGS. 10–12, elongate load-bearing beams 42 and 44 may individually comprise at least two lengthwise segments spliced by beam splicing element 106, typically when the overall length of the floor frame assembly is of the order of sixty feet or longer.

In this embodiment, a plurality of trusses are utilized as transverse frame members between the end members 46 and 48. These are typically made of wood, with metal fasteners connecting the various elements thereof, such as 72, 74 and 78, and are connected normal to the axis X—X between elongate beams 42 and 44. Trusses 74 and 78 differ from trusses 72, in a manner to be discussed hereinafter with reference to FIGS. 4–7, and are located in a region towards the end of the floor frame assembly for attachment of a wheel carriage assembly 60 during transportation thereof. By design, the cooperation of trusses 74 and 78 with elongate beams 42 and 44 accommodates and supports wheel carriage assembly 60 so that a plurality of wheels 36 are partially recessed within wheel wells 168 as best seen in FIG. 2.

FIG. 3, in partial perspective view, illustrates how a readily detachable wheel carriage assembly 60 suitable for this embodiment has a frame-like structure in which two I-section steel beams 62 and 64 are disposed normal to the elongate load-bearing beams 42 and 44 and, preferably, are bolted onto steel plates typified by 56 and 58 to thereby transfer weight of the assembly from the load-supporting beams 42 and 44 through the wheel carriage frame 60 to the wheels 36. I-section steel beams 62 and 64 are connected in the lengthwise direction by similar steel beams 66 and 68, preferably by bolts at junctions typified by 70 in FIG. 3. In a typical floor frame assembly according to the invention, the majority of lateral trusses 72, as best seen with reference to FIG. 4, are disposed and connected normal to the load-supporting beams 42 and 44. In fact, in a preferred aspect of this embodiment, the front and rear end members 46 and 48 are conveniently provided by lateral trusses 72. A convenient typical gap between such adjacent trusses for most applications is twenty-four inches between truss centers. For a stronger structure this may be reduced to sixteen inches between truss centers. Flooring material, typically three-fourths of an inch thick plywood in four-foot widths is, therefore, conveniently attachable atop the trusses.

Figure 5:
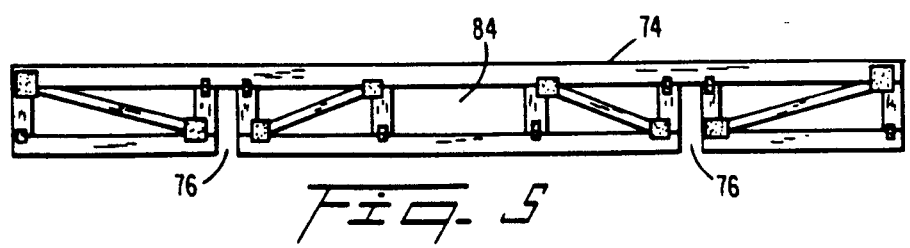
FIG. 5 is an elevation view of a second truss of the type disposed in the wheel carrier region of the floor frame assembly per FIG. 1.
Figure 6:
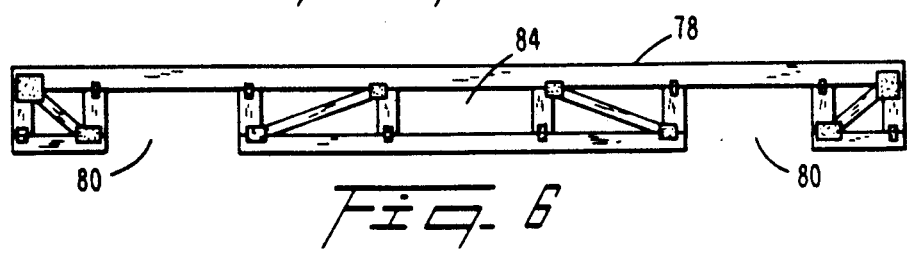
FIG. 6 is an elevation view of a third truss of the type disposed within the wheel carrier region of the floor frame assembly to partially receive load-bearing wheels therewithin per FIG. 1.

A second type of truss 74, best understood with reference to FIG. 5, while similar in overall size to first trusses 72, is formed to have at least a pair of vertically oriented and generally rectangularly shaped gaps 76 which are sized and located to receive therewithin I-section steel beams 66 and 68 of the wheel carriage assembly frame, as best understood with reference to FIG. 3. With such a disposition of girders, it becomes possible to introduce the frame of the wheel carriage assembly 60 into a recessed position within the floor frame assembly perimeter for connection thereto during transportation of the floor frame assembly and for detachment of wheel carriage assembly 60 for extraction subsequent to delivery of the floor frame assembly to its permanent destination. A third type of truss 78, best understood with reference to FIG. 6, is generally similar to truss 74 except that it is provided with two relatively wider substantially rectangular gaps 80 symmetrically disposed about the midpoint of the truss, with gaps 80 laterally wide enough to accommodate therewithin the wheels and tires of the wheel carriage assembly.

Figure 7:
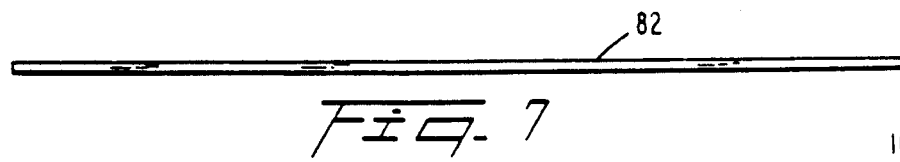
FIG. 7 is a plan view common to the first, second and third trusses, that are respectively illustrated in FIGS. 4, 5 and 6.

In this first embodiment, as best understood with reference to FIG. 7, trusses 72, 74 and 78 have uppermost members formed of wooden two-by-fours typically twelve to sixteen feet long and having an upper flat surface 82 to which a plywood floor (not numbered) may be attached in conventional manner.

Referring again to FIG. 3, at a forward end of the floor frame assembly are typical metal plates 52 and 54 connected to inside vertical surfaces of elongate beams 42 and 44 for further connection thereof to I-section transverse steel beams 86 and 88 crossbraced by connection to bracing beams 90 that are preferably made of L-section channel lengths. Reference to FIG. 16 at this point will clarify the manner in which the L-section channel lengths 90 are welded at their ends to rectangular plates 150 provided with bolt apertures 52 for connection to I-section beams 86 and 88 in a disposition best understood with reference to FIG. 2. Disposing bracing beams 90 at angles in the range 30° to 60° to axis X—X, as will be appreciated by persons skilled in the art, causes the corners of the floor frame assembly to be more rigid and capable of withstanding lateral shock loads as may be encountered during the towing process as the towing vehicle negotiates corners, bumps and associated inertial forces. Particularly when towing hitch 40 is attached to beams 86 and 88 braced by angle beams 90, the entire forward portion of the floor frame assembly is made extremely rigid and strong.

It is most convenient and effective, in terms of insuring lightness with rigidity and strength of the floor frame assembly, to connect trusses 72, 74 and 78 at their respective ends to elongate load-supporting beams 42 and 44 by means of known truss hangers 92, best understood with reference to FIG. 8. A typical truss hanger 92 has a floor region 94 "W" wide and "D" deep, with "W" being of a width sufficient to closely accommodate therein the thickness of a single truss 72, 74 or 78 at its end. Truss hanger 92 also has two vertical faces 96 that are parallel and separated by the distance "W". Contiguous with vertical surfaces 96 and normal thereto in the outward directions are similar plane sections 98 that are mutually normal to vertical sections 96 and base section 94. Depending on the size of the truss selected, the vertical sections 96 and 98 would have a height "H" and have formed in vertical sections 96 and 98 a plurality of apertures 100 through which nails or screws may be driven into the truss 72, 74 or 78 (through the apertures in sections 96) and the elongate load-supporting beams 42 and 44 (through the apertures in sections 98). This is best understood with reference to FIG. 9 which shows, in perspective, a typical truss 72 supported at a hanger 92 to be connected thereby to elongate load-bearing beam 42 at an inner vertical perimeter surface. In this connection, with reference to FIG. 2, the inside vertical surfaces of elongate beams 42 and 44 as well as end members 46 and 48 define inner vertical perimeter surfaces of the floor frame assembly.

Figure 10:
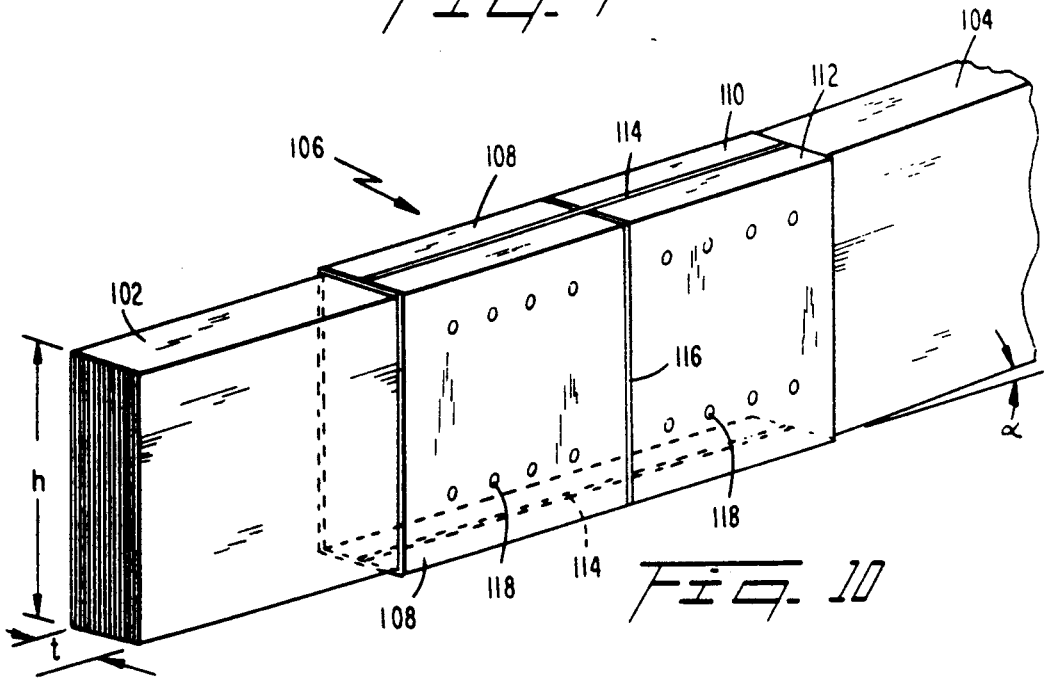
FIG. 10 is a partial perspective view illustrating a metal beam splice in an elongate load-supporting beam for generating a controlled lengthwise camber therein.

As previously indicated, when it is desired to have floor frame assemblies of lengths in excess of sixty feet, although elongate beams 42 and 44 can be obtained in veneered wood construction to be of considerable lengths, it may be desirable to connect, by splicing, longitudinally disposed lengths 102 and 104 as indicated in FIG. 10. There are two principal reasons for electing to do this: first, as a practical manner, if the floor frame assembly is to be of a length of, for example, eighty feet, in order to transport the beams from their place of manufacture to their ultimate destination, it becomes necessary to have beam segments of manageable length, e.g., forty feet long and, second, when very long floor frame assemblies are to be transported, even if a plurality of wheels disposed longitudinally is employed, the sheer inertial loads encountered in normal highway towing would have a tendency to cause the rearward end of the floor frame assembly to sag and distort. A novel and very effective solution to overcome both these problems simultaneously is to form a beam splicing element 106, starting with C-section channel elements 108 (best understood with reference to FIG. 11) and slightly modified versions of the same as represented by C-section channel elements 110 (best understood with reference to FIG. 12), with the total of four such elements, by pairs, closely fitted around the end portions of two elongate beam segments 102 and 104 contacting at their ends for welding of the metal C-sections therearound.

As will be understood with reference to FIG. 11, C-section element 108 comprises three rectangular portions, a portion 120 that is oriented vertically in use and accommodates the vertical cross-sectional dimension "h" of the elongate beam sections 102 and 104 and is formed continuous with two horizontal portions 122 and 124, each of which extends normal to section 108 by a distance not greater than one-half the thickness "t" of elongate beam sections 102 and 104. In contrast to C-sections 108, C-sections 110 have the upright portion 126 in the form of a parallelogram instead of a rectangle, the generally upright sides being parallel and inclined at a small angle "α", with sections 128 and 130 each at right angles to parallelogram-shaped section 126. The transverse extent of sections 128 and 130, like that of sections 122 and 124, is not greater than one-half the thickness "t" of elongate beams elements 102 and 104.

In practice, therefore, the two elongate beam segments 102 and 104 are placed in a jig so as to make contact at adjacent ends, with their sides coplanar. At this point, although it might be preferable to have the end of elongate beam section 104 also trimmed to be at the angle "α" with respect to a line normal to its length, this is not absolutely essential. C-section elements 108 are placed on opposite sides of elongate beam element 102 at its end and sections 110 and 112 (the latter, as persons skilled in the art will appreciate, being a mirror image of section 110) are placed to enclose the end of elongate beam section 104. Welded seams 114 and 116 are then formed in the longitudinal and transverse directions as indicated in FIG. 10 to form, in place, the beam splicing element 106. Note that apertures 118 are provided in all of the C-sections 108, 110 and 112 as indicated in FIG. 10.

Upon formation of beam splicing element 106, as just described, the wood of elongate beam elements 102 and 104 encompassed within splicing element 106 may be drilled to accommodate strong bolts through the entire splicing element and respective elongate beam elements contained therewithin. Appropriate conventional bolts, washers and nuts may then be used to complete the splicing, whereby a very long piece of elongate load-supporting beam is created in which portion 104 is cambered at the predetermined small angle "α" with respect to elongate beam element 102 butt-spliced thereto by beam splicing element 106. In practice, it is found convenient and satisfactory to produce a camber of the order of five inches in a length of twenty feet for elongate beam section 104. Depending on the circumstances and the particular sizes of the various elements involved, persons skilled in the art can thus generate very long cambered elongate load-supporting beams.

FIG. 13 illustrates a simple truss securing bracket 132, formed preferably of 18-gauge steel sheet metal, that has a long rectangular central portion 134 contiguous near both end portions with lateral rectangular portions 136 on each side extending normally therefrom. A plurality of apertures 138 is provided in all of sections 134 and 136. The use of such a truss securing bracket, after the floor frame assembly is delivered to its intended location and the wheel carriage assembly and towing hitch assemblies are disconnected and removed therefrom, is described in greater detail hereinafter.

FIG. 14 illustrates in partial perspective view wheel carriage assembly frame 60 in which steel I-section beams 62 and 64 are intended to extend transversely of axis X—X and are connected by similar steel I-section beams 66 and 68 selected to be of a length sufficient to support and accommodate a plurality of wheels as needed. Short rectangular plates 140 are welded to the ends of each of steel I-beam sections 62, 64, 66 and 68. These rectangular plates 140 are also provided with a plurality of apertures 142 for receiving bolts therethrough. The end plates 140 on steel I-beam sections 62 and 64 connect, by bolts, to attachment plates 56 and 58 which are also formed of steel and permanently attached to the inside vertical surfaces of elongate beams 42 and 44, as best understood with reference to FIG. 3. Similar attachment plates 52 and 54 are also provided at the inner surfaces of elongate beams 42 and 44 near the forward ends. Although FIG. 3 illustrates only such plates 52, 54, 56 and 58, persons skilled in the art when understanding this description will appreciate that like plates are also provided on the inner vertical surface of elongate beam 44. Similar end plates 140 are welded to the respective ends of longitudinally oriented I-beam sections 66 and 68 and are attachable by bolting to transverse steel I-beam sections 62 and 64. To further brace the wheel carrier assembly and to provide additional support to conventional spring and wheel axle assemblies (not illustrated since such are commonly known) L-section channel lengths 146 are bolted to the underside (as in use) of longitudinally oriented I-beam sections 66 and 68, as illustrated in FIG. 14.

A plurality of U-section steel axle mounting brackets 144, each having a flat base and two flat vertical sides normal thereto, as best illustrated in FIG. 14, are welded or otherwise connected in known manner at suitable locations of the lowest surfaces of webs of steel I-section lengths 66 and 68. These are provided with apertures (not numbered) of a size sufficient to accommodate bolts for the attachment thereby of leaf springs or other such known techniques for attaching wheel axles thereto. In the embodiment of the wheel carrier frame illustrated in FIG. 14, six such axle mounting brackets 144 are shown attached to each of I-section beams 66 and 68. Such a disposition would readily permit the mounting of six wheels, at three to a side on three axles, each axle being supported by two of brackets 144 on each side. Other variations to support a different number of wheels are apparent. A number of commercially available spring and axle assemblies are available on the market for the purposes under consideration and details thereof are not believed essential to an understanding of the essence of the present invention.

Referring again very briefly to FIG. 3, it is seen how the wheel carrier assembly frame is received within the lower portion of the floor frame assembly for attachment to the inner vertical perimeter surfaces of elongate beams 42 and 44. The entire floor frame assembly would be supported essentially by a plurality of wheels attached to this wheel carrier frame, with a portion of the overall weight of the floor frame assembly being supported during transportation by the towing vehicle attached at the front end of towing hitch assembly 40. Upon transportation of the floor frame assembly to its intended location, whereat adequate supports must be provide around the periphery of each floor frame assembly so that the weight of the same and any superstructure mounted thereon would be conveyed by load-supporting beams 42 and 44 to such support elements. Unbolting of the various I-beam sections 62, 64, 66 and 68 thereafter permits ready removal of the wheel carriage assembly frame from the underside of the floor frame assembly 30.

In a very similar manner, the towing hitch assembly 40 is also unbolted and removed from the front end of the floor frame assembly. In most cases, it is found convenient to then mount the towing hitch assembly, to the wheel carrier assembly to simply tow the same on its wheels for reuse in transporting another floor frame assembly.

Upon removal of the wheel frame assembly from the floor frame assembly once the latter is supported at its intended location, it is found desirable to ensure the structural strength of the floor frame assembly by introducing spacing blocks 148 that are shaped and sized to closely fit into, for example, gaps 80 in trusses 78, as best understood with reference to FIG. 15. Persons skilled in the art will immediately appreciate that similar spacer blocks can be shaped and sized to closely fit inside gaps 76 of trusses 74. In either case, suitably sized brackets 132, again as indicated in FIG. 15, may then be used to retain spacer blocks 148 in place and also to ensure tensile strength in the lower reaches of trusses 78 and 74 as appropriate.

The towing hitch assembly 40, as best understood with reference to FIG. 17, includes two I-section lengths 154 that together form a V-shape braced by lateral, preferably L-section, lengths 158 and 160 welded thereto. Flat metal plate sections 156, provided with bolt apertures (not numbered) are conveniently welded to the upper portions of the towing hitch assembly for bolting thereof to support steel I-beams 86 and 88 that are temporarily attached and recessed into the floor frame assembly at its forward end (as best understood with reference to FIG. 3). At the apex of the V-shape of towing hitch assembly 40 is provided an internally threaded portion receiving a vertically oriented elongate threaded screw jack 164 that can be manually rotated by a crank handle 166 to raise and lower the front end of towing hitch assembly 40 with respect to the ground. At the extreme forward end of the V-shape of towing hitch assembly 40 may be provided a hook-like element 162 to enable coupling, by conventional means, to a typical towing hitch on a towing vehicle. As in the case of the detachable wheel carrier assembly, upon delivery of the floor frame assembly to its intended location, the towing hitch assembly 40 and associated metal elements may be detached and removed from the floor frame assembly 30. Basically, therefore, once the floor frame assembly has been delivered and is mounted at its intended location, practically all the heavy and expensive metal elements that were temporarily attached thereto are readily removed therefrom for use elsewhere.

Referring now to FIG. 18, which shows in partial perspective view more details of how the wheel carrier assembly frame 60 is received into the wheel carrier receiving portion of the floor frame assembly (in FIG. 18 shown in upside down view), it is seen that elongate longitudinally oriented wooden elements 50 are conveniently provided between adjacent trusses at what will be the lowest surfaces thereof during use to brace the trusses with respect to each other and also to provide readily accessible locations at which to attach a thin sheet-like element 168 that extends substantially across the lower expanse of the floor frame assembly 30 to, in effect, generate a box-like structure that excludes moisture, dirt, insects and pests such as rodents. This thin sheet-like material 168 can be thin plywood or, where appropriate, asphalted paper or the like, with or without a net-like reinforcement included therein. Various materials are commonly known for such protective purposes and should be familiar to persons skilled in the art.

To ensure that dirt and moisture do not enter truss regions during transportation in wet weather when splashing of water could force dirt to contact with the nails and rear metallic elements of the floor frame assembly, open box-type generally rectangular wheel-well casings 170, preferably made of material such as fiberglass, are introduced and affixed into the floor frame assembly where the wheels are to be partially recessed therein. Although fiberglass would be a convenient material for this purpose, numerous other materials, e.g., aluminum sheeting, exterior plywood or tempered hardboard may be utilized to form the wheel-well casings 170. These wheel well casings typically will remain within the floor frame assembly but, after removal of the wheel carrier assembly from the floor frame assembly, may be covered with the same material 168 as is used underneath the rest of the floor frame assembly 30.

To summarize, what has been described in a first preferred embodiment of the present invention is a modular, readily towable floor frame assembly of extended size, preferably formed with the elongate load-bearing beams cambered to accommodate shock loads during transportation, the same being towable on a readily detachable wheel carrier assembly partially recessed into the floor frame assembly, the entire unit being towed with a towing hitch assembly affixed temporarily thereto. Persons skilled in the art will appreciate that recessing of the load-supporting wheels into the floor frame assembly will ensure a lower center of gravity during transportation, thus making the entire unit safer and more stable even at highway speeds where transverse winds or other adverse travel conditions may be encountered.

Although certain structural details have been illustrated in FIGS. 4, 5 and 6 for the first, second and third type of trusses discussed in detail hitherto, persons skilled in the art will appreciate that other forms of crossbracing and the like may be utilized with equal effectiveness. A particular advantage of the specific geometries illustrated in FIGS. 4, 5 and 6 for the trusses is that these trusses may each be designed with an opening 84 therethrough of a size and shape such that heating and ventilating duct lengths (omitted from the figures to avoid confusion) may be laid integral therewith during assembly of the floor frame assembly. Likewise, lengths of piping (not illustrated) for carrying water and/or gas may be affixed into the inner reaches of the trusses disposed along the length of the floor frame assembly. Lengths of electrical wiring (not illustrated) may be conveniently stapled underneath the floor and will extend along the floor frame assembly 30.

Persons skilled in the art will also appreciate that assorted types of thermal insulation may be stapled or otherwise affixed integrally with the floor frame assembly 30 as the same is being assembled, e.g., fiberglass affixed to vapor barrier type aluminized sheet can be nailed or stapled between adjacent trusses and between end trusses and the cross members at the ends of the elongate load-supporting beams 42 and 44. When such refinements are included in the floor frame assembly, provision of the moisture, dirt, insect and pest excluding sheet-like layer 168 creates a very compact, light, relatively inexpensive, modular and easily towable floor frame assembly that is extremely convenient to use either as a single unit supported underneath its periphery at its permanent location or, where larger sizes are desired, a coupling of two such floor frame assemblies side by side with metal post supports under the peripheries in a central region. Such assemblage of individual modular units is common and can be conveniently practiced by persons skilled in the art in known manner.

One or more floor frame assemblies as described herein may be utilized as the lowest floor, e.g., in a building structure with a basement, and attractive ceiling material may be nailed, glued or otherwise affixed to the underside of the floor frame assembly 30 to serve as a conventional ceiling for the basement of the building. Similarly, where such floor frame assemblies are utilized as the second floor of a building structure, ceiling material may similarly be utilized to cover up the lowest surface of the floor frame assembly 30. As persons skilled in the art will appreciate, recessed lighting fixtures, air vents and the like can be conveniently mounted in known manner therein. The same is true of fire protection systems involving sprinklers and pipes to deliver fire retardant fluids.

There are occasions when a modular structure needs a floor of the order of 60 ft. to 80 ft. in length and between 18 ft. and 20 ft. in width. Since it is economically impractical to form, tow into place, and then join two floor frame assemblies of the type described hitherto, each being over 60 ft. long and only 10 ft. wide, it is highly desirable to have a single unified floor frame assembly manufactured to the larger size. Unfortunately, when trusses of the type described hitherto are employed as transverse load-supporting or load-bearing frame members, it is difficult to obtain the desired rigidity and strength in the final structure. Furthermore, for certain housing needs it is highly desirable to have unified floor frame assemblies in which the floor area can be provided in sections, of which some sections are at a different vertical height with respect to the others. Such a structure, for example, could be utilized to form the basis for a prefabricated home in which a dining area may be say 6 to 8 inches below the living area. The previously-described structure employing trusses and joists does not permit reduction of the vertical height of any segment of the floor frame assembly with respect to the lowest edge of the elongate load-bearing elongate beams to a significant degree.

Both of the desirable aspects discussed in the immediately preceding paragraph, i.e., the provision of a single unified floor frame assembly in widths of up to 20 ft. and the provision of floor areas at different vertical heights, are fully realized by replacing the trusses and joists of the first described embodiment of this invention by wood I-beams of selected size and strength, and by employing load-bearing elongate beams of different vertical cross-sectional dimensions coupled by a modified form of the butt-splice element 106 illustrated in FIG. 10. Furthermore, where the vertical cross-sectional dimension of the elongate beam is deliberately reduced to obtain a commensurately lower floor area supported thereby, compensation may be made for the otherwise reduced strength by providing, for example, two such beams adjacently and in parallel to share the load. Another embodiment of the present invention, incorporating such features, will now be described with particular reference to FIGS. 19 through 30. As a matter of convenience, this will be referred to as the "second embodiment" and, for purposes of description, the previously described embodiment hereinafter will be referred to as the "first embodiment."

FIG. 19 discloses in partial perspective view a structure according to the second embodiment in a manner generally comparable to that employed in illustrating similar aspects of the first embodiment per FIG. 3. It is contemplated that, except for obvious differences that will become clearer, the towing hitch assembly 40 illustrated in FIG. 17 and any wheels and axles to tow the assembly are equally usable with both the first and the second embodiments.

The frame structure 200 of the second embodiment, per FIG. 19, comprises two elongate outer load-bearing wooden beams connected to each other by a plurality of transverse load-bearing members which are wooden I-beams. The very ends of outer elongate beams 202 and 204 are connected at a front end of the frame assembly 200 to a front transverse end wood I-beam 206 by relatively lightweight metal beam-hangar elements 208 and 210 of known type. A similar rear end wood I-beam (not illustrated) is provided in similar manner at the other ends of elongate beams 202 and 206. Such beam-hangar elements, like truss hangars 92 previously described with reference to FIG. 8, are commercially available in a variety of sizes and, therefore, will not be described further in greater detail. Persons skilled in the art of using wooden I-beams in frame structures should be able to locate a source of such hangars.

What is important to appreciate, keeping in mind the goals of reduced metal usage and minimization of cost, is that such metal elements are used only where absolutely essential and represent a very small fraction of the overall weight and cost of the finished unified frame assembly. It should be appreciated that at the end corners the I-beams hangars 208 and 210 will have a somewhat different form than that of I-beam hangars such as 212 and 214, these having different vertical dimensions as seen in FIG. 19, to support and match the ends of transverse I-beams 216 and 218 respectively.

Although further discussion of the properties and dimensions of wooden I-beams follows below, a quick reference to FIGS. 22, 23 and 24 at this time may be helpful.

Figures 22, 23, 24:
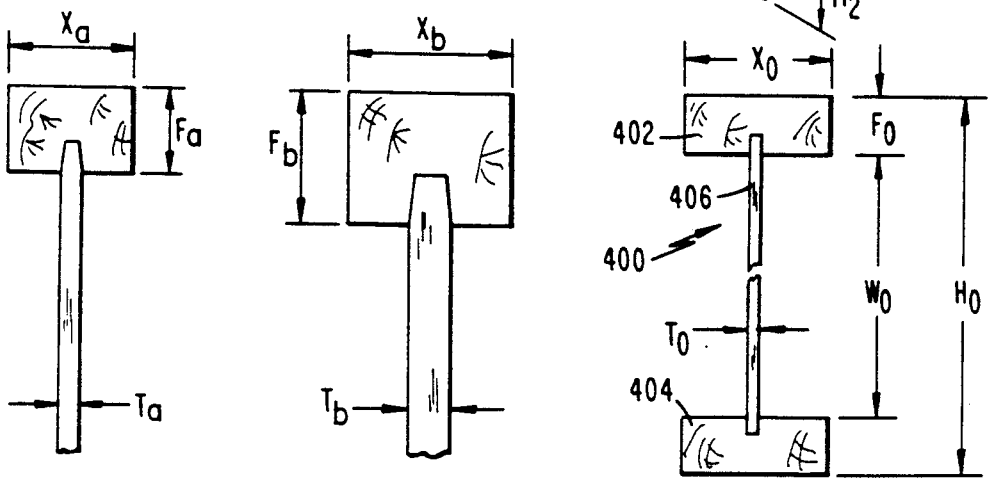
FIGS. 22, 23 and 24 each illustrate in partial vertical cross-sectional views details of a typical wooden I-beam of the type used in the embodiment per FIG. 19.

It will be seen in FIG. 24 that, in cross-section, such a wooden I-beam 400 has an upper transverse flange 402 and a lower transverse flange 404, preferably made of strong and stable, i.e., nonwarping, wood material, typically having a rectangular cross-sectional area of dimensions $X_o$ and $F_o$. Although FIG. 24 illustrates the upper flange 402 and the lower flange 404 as being of the same shape and size, this is not essential and, given appropriate circumstances, a person of ordinary skill in the art utilizing this invention may wish to select upper and lower flanges of different dimensions. Upper and lower flanges 402 and 404 are connected by a web 406 extending therebetween and having a thickness $T_o$ and an exposed width between the upper and lower flanges 402 and 404 of dimension $W_o$. Web 406, as more easily understood with reference to FIGS. 22 and 23, may be formed to have tapered outer edges received within correspondingly tapered recesses of the corresponding flanges to be adhered or glued thereat with conventional strong, waterproof, and long-lasting glue or other adherent material.

The overall outer dimension of the cross-section of exemplary wooden I-beam 400, as illustrated in FIG. 24, will be $X_o$ and a height $H_o$. The precise dimensions of various portions of the wooden I-beam, naturally, relate to the overall strength, stiffness, and commercially available spans for such elements. Manufacturers thereof typically provide such details in readily accessible form, e.g., in product catalogs. Similarly, such manufacturers either themselves produce or have sources that provide hangers such as 212 and 214 illustrated in FIG. 19 for use with their wooden I-beams.

As in the first embodiment, structural elements such as air ducting, piping for water and/or gas, electrical and telephone wiring, and the like may conveniently be accommodated within the floor frame assembly. To accommodate such elements, there are conveniently provided holes or apertures such as 220, 222, 224, 226 and 228, these being best seen in FIG. 19. Selection of the web dimension $W_o$ and web thickness $T_o$ will ensure sufficient strength in the corresponding wooden I-beam to accommodate such holes without significant loss of strength. It should also be further appreciated that when a wooden I-beam is subjected to vertical loads, i.e., loads substantially normal to its longitudinal direction and in the plane of its web, the upper flange experiences compressive stresses and the lower flange experiences tensile stresses. Consequently, by providing a suitably sized lower flange, the amount of tensile or compressive stresses carried by the central portion of the web is significantly reduced and the presence of such holes or apertures 220 in wooden I-beam 216 should not seriously weaken the same. It is this aspect of the wooden I-beam structure that makes it extremely efficient for providing the 18 ft. to 20 ft. transverse span possible with this invention.

The various other aspects of the first embodiment described earlier, e.g., the spacing of adjacent transverse load-bearing elements, dirt-excluding sheet cover under the frame assembly bottom, flooring, and the like are not changed with respect to the second embodiment except in obvious ways.

As previously noted, the towing hitch assembly 40, best understood with reference to FIG. 17, has flat metal plate sections 156 provided with bolt apertures for bolting thereof to support I-beams 86 and 88 temporarily attached to the floor frame assembly of the first embodiment. In a somewhat similar manner, a steel I-beam 230 may be temporarily attached below longitudinal beams 202 and 204 at a front end thereof to temporarily attachable metal brackets 232 and 234, each of which is provided with a metal L-section 236 for bolting to the temporarily attached steel I-beam 230. Steel plates 238 and 240 are temporarily attached to the bottom surface of the lower flange of end wooden I-beam 206 and the towing hitch assembly 40 is temporarily attached thereat as well. Because of the angled disposition of elements 154 of towing hitch assembly 40, this provides a readily detachable but very strong connection between the towing hitch assembly and the front end of the unified floor frame assembly utilizing wooden I-beams. It is thus possible to safely exert a towing force and provide support for the front end of unified floor frame assembly 200 when the same is towed by a tractor vehicle.

As illustrated in FIG. 14, to tow the first embodiment there was provided a detachable wheel carrier assembly frame 60 made of steel, the same being provided with brackets 144 for attachment thereto of leaf springs of conventional type supporting axles with wheels in pairs. An alternative to such a detachable all-metal wheel carrier assembly frame, particularly suitable for the second embodiment, is illustrated in FIGS. 19 and 20, utilizing principally a wooden construction.

Figure 20:
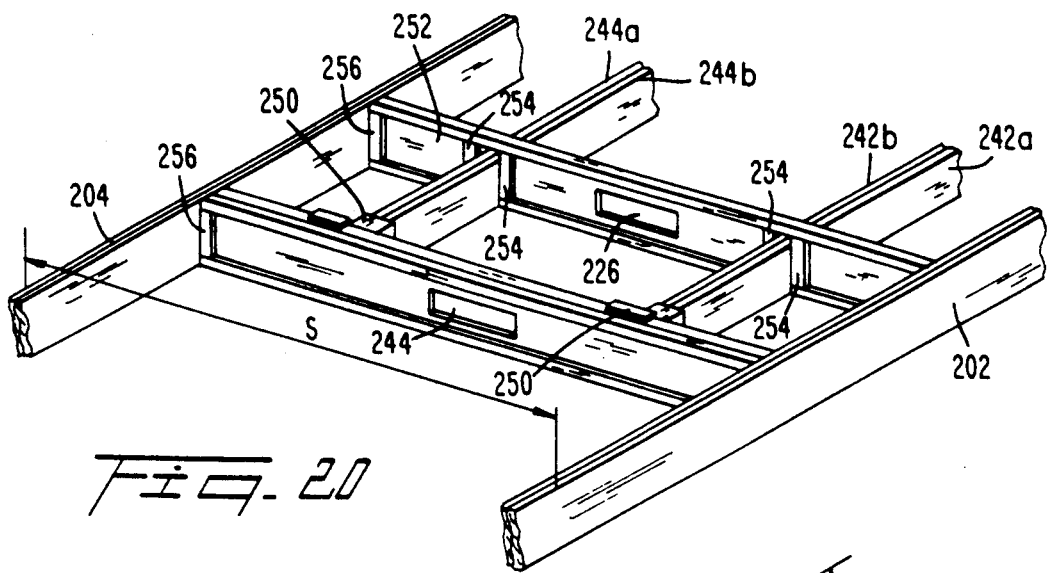
FIG. 20 is a partial perspective enlarged view of a portion of the embodiment per FIG. 19 to more clearly illustrate the manner in which double thickness elongate longitudinally disposed beams may be connected to transverse wooden I-beams.

As best seen in the somewhat enlarged partial perspective view of FIG. 20, double thickness elongate wood beams 242 and 244, each comprising individual beams 242a, 242b and 244a, 244b, respectively, are disposed symmetrically about a longitudinal axis of the frame assembly. The two thicknesses are strongly coupled by generally U-shaped metal brackets such as 270 (see FIGS. 25). These beams are intended to support, in detachable manner, a plurality of wheels therebelow in a manner generally similar to that employed with the first embodiment. The principal difference, however, is that instead of using a steel wheel carrier frame assembly that is to be separated out, the structure of the second embodiment employs longitudinally oriented wood wheel support beams 242 and 244 that remain within the final assembly, with only the wheel axles and springs being detached therefrom after location of the frame assembly at its destination.

Wheel support beams 242 and 244 are each attached at their front and rear ends to transverse wood I-beams 246 and 248, respectively, by means of conventional beam hangars 250 of known and commercially available type. Between transverse wood I-beams 246 and 248, which connect to the respective ends of beams 242 and 244, there are disposed a plurality of transverse wooden I-beams 252 having portions cut out from their lower flanges and webs at appropriate locations and in a size sufficient to receive closely therein the total thickness of beams 242 and 244. This, obviously, generates a structural weakness in wooden I-beams such as 252, hence reinforcement must be provided. Alternatives for providing such reinforcement are discussed immediately below.

In one alternative, upright wooden elements 254 are affixed on each side of the cuts, e.g., as shown in wooden I-beam 252 in FIG. 20, on both sides of the wood I-beam web. These blocks have a thickness substantially equal to one half the dimension $(X_o - T_o)$ as understood with reference to the exemplary wooden I-beam FIG. 24. Also, with similar considerations, comparable wooden reinforcement elements 256 are provided at the ends of transverse wooden I-beams such as 216, 214, 252, 248 and the like.

Figure 27:
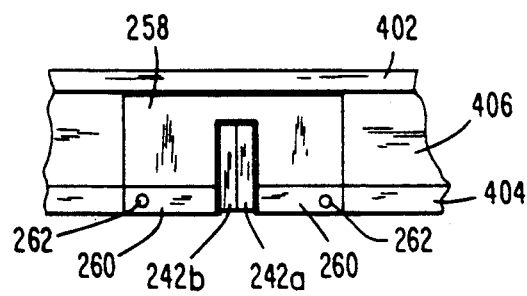
FIG. 27 is a partial elevation view of a portion of a transversely oriented wooden I-beam element formed and reinforced to receive therein and attach to a longitudinally oriented wooden support element.
Figure 30:
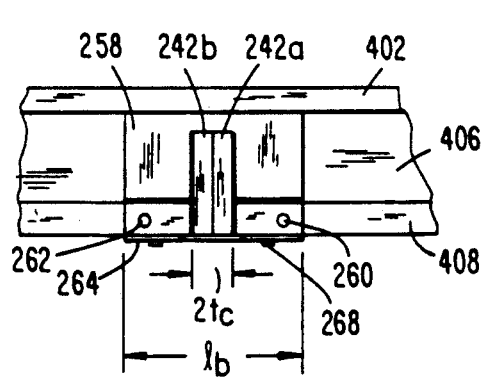
FIG. 30 is a partial elevation view illustrating the assembled form of the elements of FIGS. 28 and 29 with the transverse wooden I-beam per FIG. 27 for attachment thereto of a longitudinally-oriented wooden beam in the assembly according to the embodiment of FIG. 19.

Another alternative for providing reinforcement in the web portion of the wooden I-beam to compensate for the making of the cut to accommodate beams such as 242 or 244, as best understood with reference to FIGS. 27 and 30, is to provide a shaped piece of plywood 258 on each side of the web so as to extend between the upper and lower flanges 402 and 404. Plywood piece 258 extends on either side of the cut by a predetermined distance Y corresponding to the length of a thin sheet metal U-section reinforcement bracket 260 illustrated in detail in FIG. 28. Reinforcement bracket 260 may be attached to lower flange 404 by conventional screws or bolts passed through exemplary apertures 262 provided therefor. Such reinforcement brackets 260 may also be utilized on either side of comparable cuts in the first alternative where wooden elements 254 are provided, either glued or nailed to the web of the wooden I-beam, for attachment of a further reinforcement element as described in the next paragraph.

Figure 28:
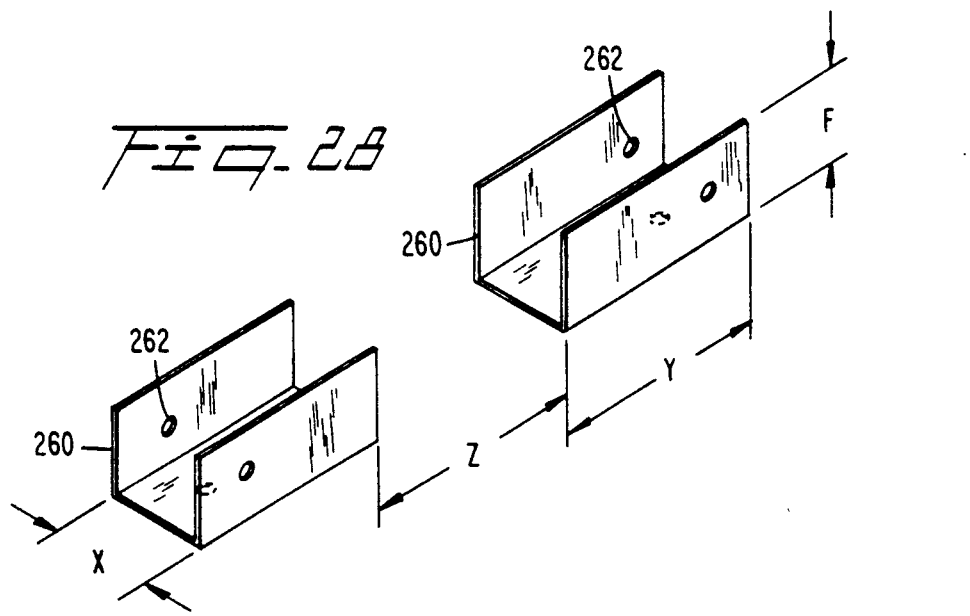
FIGS. 28 and 29 illustrate metal elements that attach to the transverse wooden I-beam per FIG. 27 and a longitudinally oriented internal wooden element for secure joinder thereof.

As best seen in FIG. 28, U-shaped reinforcement brackets 260 are each formed of three planar sections. The base of the U has a width X, the height of the side sections is F and the length of the base and the side sections is Y. At this point, reference to FIGS. 22 and 23 shows that, depending upon the specific loading anticipated, a person practicing the present invention may wish to correspondingly select the dimensions of the flanges and the web for the wooden I-beams, with choices available in the selection of the flange widths $X_a$, $X_b$, the flange thicknesses $F_a$, $F_b$, as well as the web thicknesses $T_a$, $T_b$. The dimensions X, F, and Y for the thin steel reinforcement element 260 are commensurately chosen, to avoid wasting metal and unnecessarily increasing the weight and the cost of the frame assembly. Persons skilled in the mechanical arts can be expected to exercise such reasonable judgment in light of the anticipated loading and circumstances of use for a given frame assembly.

Figure 29:
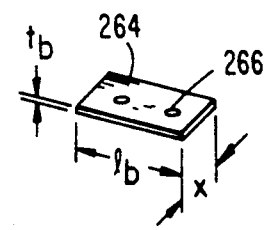

Referring now to FIGS. 29 and 30, it is seen that a thin and relatively lightweight but strong metal plate 264, having a thickness $t_b$, a length $l_b$ and a width X, provided with at least two apertures 266 sized to receive conventional screws or bolts therethrough, is conveniently attached to the thin sheet steel reinforcement elements 260 and the wood flange therein to consolidate the inclusion of longitudinally disposed beams such as 242 and 244 within wooden I-beams crossing the same and, thereby, to restore to the cut I-beams the tensile strength necessary at their lowest portions.

As noted before, the use of metal reinforcement elements 260 and reinforcement plate 264 is available with either alternative, the one utilizing wooden elements 254 as best illustrated in FIG. 20, or the one utilizing a suitably cut piece of plywood 258 per FIGS. 27 and 30. In either case, the wooden elements 254 and 256, or plywood element 258, depending on which is selected, may be glued, nailed or otherwise affixed to the web of the corresponding wooden I-beam.

Thus, with either alternative, there is provision integrally within the framework beams 242 and 244 for attachment thereto of a plurality of axles rotatably supported on wheels, with the wheels themselves recessed within the framework between the outer load-supporting beams 202 and the inner wheel-supporting beams 242 and 244. The attachment of reinforcement plate 264 to reinforcement elements 260 ensures that tensile strength is substantially restored to the respective wooden I-beams through which the wheel supporting beams 242 and 244 are passed.

As best seen in FIG. 25, a plurality of U-shaped metal brackets 270 are conveniently attached by the passage of screws through apertures 272 provided at the vertical sides thereof to the wheel supporting beams 242 and 244. These brackets also serve to hold together the double thickness of the longitudinal beams 242a and 242b in exemplary beam 242. Thereafter, U-shaped wheel support brackets 276 are detachably detached to the underside of U-shaped brackets 270 by conventional screws or bolts passed through apertures 278 and 274.

Figure 21:
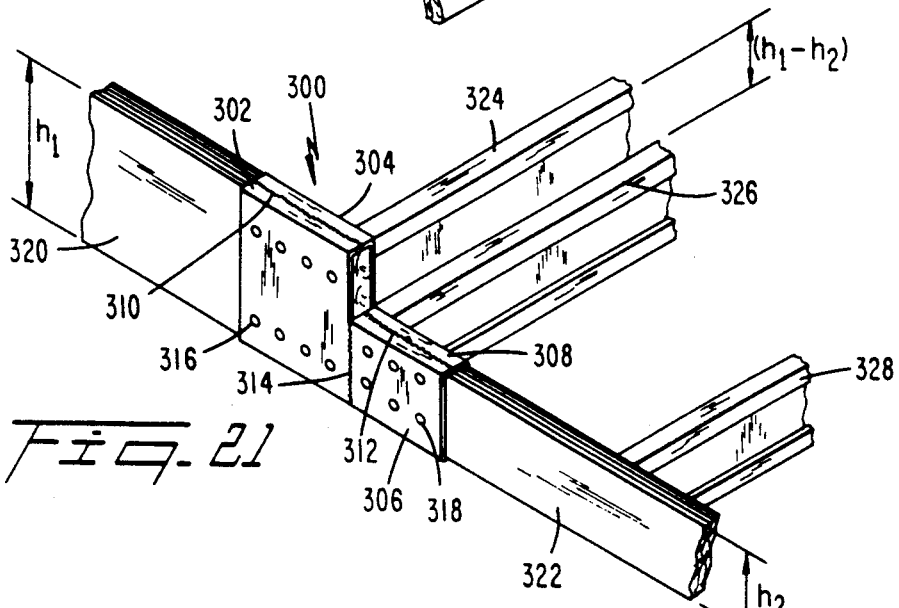
FIG. 21 is a partial perspective view particularly illustrating the manner in which two outer elongate load-bearing wooden beams, each of a different vertical cross-sectional dimension, are butt-spliced to enable the provision of floor segments at relatively different heights.

In FIG. 21 there is illustrated a modified form of the basic butt-splicing element 106 that was illustrated in FIG. 10. The modification consists in having butt-splicing element 300 shaped, sized and disposed to receive therein two longitudinal load-supporting beams that have different vertical cross-sectional dimensions $h_1$ and $h_2$. SUch a dual-sized butt-splicing element 300 is formed of four C-section channel elements, of which elements 302 and 304 are sized to cooperatively form a sleeve to closely receive therein and fit to one end of an elongate load-supporting beam 320 (having a height $h_1$) and two other C-section channel elements 306 and 308 which act cooperatively to form sleeve that is shaped, sized and disposed to closely receive therein one end of another supporting beam 322 (having a height $h_2$).

In practice, these C-section elements 302, 304, 306 and 308 would be selected to be of the appropriate size, with their lengths along the beam longitudinal direction selected to permit connection with the received elongate load-supporting wooden beams by the passage of conventional screws or bolts through a plurality of apertures 316 and 318 provided in at least two linear arrays as illustrated in FIG. 21. The sections 302 and 304 are welded along their lines of contact, and the same is done separately for the sections 306 and 308. This results in weld lines 310 and 312, respectively, at the top of joined together sections 302 and 304 for beam 320 and 306 and 308 for beam 322. Similar welds are formed at their other contacting edges (not visible in FIG. 21 but at the lower side and the other side of beams 320 and 322). Further welding is provided along a contact line 314 to solidly connect portions of the edges of elements 302 and 304 immediately adjacent corresponding edges of the combined segments 306 and 308.

In effect, therefore, there is created a steel, dual-sized, sleeve having one portion shaped and sized to closely receive therein an elongate beam having a vertical cross-sectional dimension $h_1$ and another section shaped and sized to receive closely therein an elongate beam 322 having a relatively smaller vertical cross-sectional dimension $h_2$. When the respective beams are firmly attached to the respective sleeves thus provided by means of conventional screws or bolts passed through apertures 316 and 318, the two elongate wood beams become securely and strongly butt-spliced. A similar arrangement is provided on the opposite side of the frame assembly. As will be appreciated, and as was explained with reference to FIGS. 11 and 12, a small predetermined built-in camber, corresponding to a small angle "α", can be provided by cutting at that small angle "α" the edges of one of the pairs of elements 302 and 304 or 306 and 308. In other words, by employing the same technique as was employed where longitudinal load-supporting beams 102 and 104 both had the same vertical cross-sectional dimension and thickness, a user of this invention can with about the same degree of simplicity butt-splice two differently dimensioned elongate load-supporting outer beams 320 and 322 with a desired built-in initial camber "α". By doing this, the user then can enjoy all the advantages previously discussed in relation to the first embodiment, e.g., accommodation for the sagging and deformation incidental to the creation of a relatively long and inherently somewhat flexible unified frame assembly.

As will be appreciated by persons skilled in the art, the reduction of the vertical cross-sectional dimension of one of the butt-spliced elongate load-supporting beams would tend to create a region of lower strength in that portion of the unified frame assembly. Since the reason for splicing together elongate load-supporting of different vertical cross-sectional dimensions is to enable the provision of floor sections at different heights, it is important to ensure that even such a structure has the requisite strength to be safely towed to its ultimate destination and to ensure that all of its transverse wooden I-beams are securely and strongly supported at their ends.

As best seen in FIG. 26, a butt-splicing steel element 500 can be formed of C-section elements 502, 504, 506 and 508 each sized to be able to receive closely therein the thickness $t_e$ of each of two similarly sized parallel elongate paired beams 510 and 512 on one side and 514 and 516 on the other side, with accommodation made for generating a camber In other words, simply by appropriately selecting the size of the steel elements that are welded together to form the butt-splicing element as taught herein, it is possible to easily provide double the strength in the butt-spliced outer load-supporting beams. By an obvious combination of the teaching of FIGS. 21 and 26, persons skilled in the art can readily form a dual-sized butt-splicing element 300 commodious enough to accommodate at each side pairs of parallel but differently sized cooperating wood beams, with the provision of a predetermined small camber "α" included.

By selecting appropriate dimensions for the discussed elements and by using wooden I-beams, the user of the present invention can thus form wide and long totally unified floor frame assemblies that employ very little metal permanently, are relatively light but rigid and strong, which can be comfortably transported over long distances by highway, and which can, as was described in detail for the first embodiment, be conveniently located and supported in place to serve as extensive floors for a variety of conventional housing accommodations.

Although every detail provided in the description of the first embodiment is not repeated with respect to the second embodiment, it is expected that persons of ordinary skill in the art, upon comprehending details of both embodiments, will readily be able to understand and integrate the teaching of this disclosure to enjoy the advantages provided by this invention in each of its embodiments.

In order to obtain the maximum value from this invention, it is believed most advantageous to use veneer wood beams, for example those commercially provided by Gang-Nail Systems, Inc., of Miami, Florida. Such products are available in a wide variety of cross-sectional dimensions and lengths. Also, as will be readily appreciated, the use of such veneer products assures stable and consistent quality as well as strength and durability, i.e., veneered products manufactured with appropriate weather-resistant glues experience less distortion, splitting, and other types of weakness in use than do single planks. It is, therefore, contemplated that the present invention will likely be practiced with wood veneer products and commercially available wooden I-beams although it is not limited to such components. It is also contemplated that connections among and between such wooden elements will be made with any of a variety of commercially available products expressly designed for convenient and secure fastening of such elements.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A readily towable wide unified floor frame assembly, comprising:

two elongate load-supporting outer beams disposed parallel to a longitudinal axis of said floor frame assembly, each of said beams having respective front and rear ends;

front and rear end wood I-beam members respectively connected perpendicular to said axis at said front and rear ends of said outer beams, defining therewith a perimeter of said floor frame assembly, said perimeter having substantially vertical inner and outer perimeter surfaces substantially defined by corresponding inner and outer surfaces of said outer beams and said end members;

a plurality of first wood I-beams normal to said outer beams and connected to said inner perimeter surface, said first wood I-beams being disposed at predetermined locations inwardly of said front and rear ends of said outer beams so as to define therebetween a region for accommodating a plurality of wheels for supporting said frame assembly during towing thereof;

a pair of inner wood beams symmetrically disposed in said wheel accommodating region parallel to said longitudinal axis and connected at their respective ends to a correspondingly located pair of said first wood I-beams, said inner wood beams being provided along a bottom edge thereof with wheel attachment brackets;

a plurality of second wood I-beams normal to said outer beams and respectively connected to said inner perimeter surface inside said wheel-accommodating region, said second wood I-beams each being formed with a plurality of vertical first gaps extending across a lower flange into a web thereof and disposed symmetrically about said axis, each of said gaps being of a width and height sufficient to closely accommodate a corresponding one of said inner wood I-beams therewithin;

a plurality of third wood I-beams interspersed with said second wood I-beams, normal to said outer beams and respectively connected to said inner perimeter surface inside said wheel accommodating region, said third wood I-beams each being formed with a plurality of vertical second gaps extending across a lower flange into a web thereof and disposed symmetrically about said axis, each of said gaps being of a width and height sufficient to accommodate said wheels, whereby upper portions of said wheels are partially contained within said second gaps and said floor frame assembly when said wheels are attached to and support said floor frame assembly;

a floor mounted atop and to said outer beams, said front and rear end members, and said first, second and third wood I-beams; and hitch means securely attachable to and readily detachable from a front end of the floor frame assembly for applying a towing force thereat.

2. A readily towable unified floor frame assembly according to claim 1, further comprising:

a plurality of means for providing bracing to said wood I-beams and floor support, disposed substantially horizontally between adjacent ones of said first, second and third wood I-beams and said front and rear end members.

3. The readily towable unified floor frame assembly according to claim 1, further comprising:

hitch attaching means for attaching said hitch means to said floor frame assembly, said hitch attaching means comprising a plurality of metal elements affixed to said inner perimeter surface at predetermined locations on said outer load-supporting beams, said metal elements being formed to be securely attachable to said hitch means and readily detachable therefrom when separation of said hitch means from said floor frame assembly is desired.

4. The readily towable unified floor frame assembly according to claim 1, wherein:

at least one of said front and rear end elements and said first, second and third wood I-beams each are formed to each have an aperture defined normal to said longitudinal axis of said floor frame assembly and aligned to readily receive for permanent placement therein of lengths of elongate elements comprising one of ventilation and heating ducts, utility piping and electrical wiring while said floor frame assembly is being manufactured.

5. The readily towable unified floor frame assembly according to claim 1, wherein:

at least ninety-nine percent by weight of the unified floor frame assembly, exclusive of said detachable wheels and axles and said hitch means, is constituted of wood.

6. The readily towable unified floor frame assembly according to claim 1, further comprising:

covering means comprising an expanse of a thin sheet-like moisture resistant material attached to the floor frame assembly on the opposite side from said floor thereof, extending substantially over all of said first, second and third wood I-beams and said perimeter except a space immediately around the wheels while the wheels and corresponding axles are attached to said floor frame assembly to support the same, for thereby excluding dirt, pests, insects and moisture from the volume occupied by the floor frame assembly.

7. The readily towable unified floor frame assembly according to claim 6, further comprising:

thermal insulation material disposed between an under surface of said floor and said covering means within the inner perimeter surface of said floor frame assembly.

8. The readily towable unified floor frame assembly according to claim 1, wherein:

said outer beams each comprise a plurality of coplanar elongate segments butt-spliced at their respective adjacent ends by means for splicing said segments by firm attachment thereto.

9. The readily towable unified floor frame assembly according to claim 8, wherein:

said splicing means comprises weldable metal splicing segments assembled to simultaneously overlap a length of each of said pair of adjacent coplanar beam segments, said splicing segments being welded together to form a separate closely fitting sleeve portion around a respective length of each of the spliced adjacent segments enclosed therein, said sleeve portions and the enclosed beam segments being permanently attached by means for attaching the same.

10. The readily towable unified floor frame assembly according to claim 9, wherein:

the splicing segments are formed such that the welding thereof causes the beam segments spliced thereby to be spliced at a predetermined obtuse angle with respect to each other instead of being collinear in their common plane.

* * * * *